2,971,034
PROCESS FOR THE PRODUCTION OF AZULENES

Klaus Hafner, Marburg, Germany, assignor to Studiengesellschaft Kohle m.b.H., Mulheim (Ruhr), Germany No Drawing. Filed July 16, 1957, Ser. No. 672,138

Claims priority, application Germany July 25, 1956

13 Claims. (Cl. 260—666)

This invention relates to a process for the production of azulenes.

Various synthetic processes for the production of azulenes are already known. Some of these processes proceed by way of intermediate products which are considerably more highly saturated, i.e. contain at least four more hydrogen atoms in the molecule than the azulenes, and consequently necessitate a comparatively strong final dehydrogenation, resulting in very poor yields. The final yields of azulenes, calculated on the starting materials required for the preliminary synthesis stages, are in all cases only a few percent and frequently only fractions of 1%. Thus, E. A. Braude and W. F. Forbes (Nature, volume 168, 874, 1951) do not indicate any yields for the eight-stage azulene synthesis from cycloheptanone they describe, whereas they do state the yields of the preliminary stages for the dehydrogenation of the alkylbicyclodecadiene to form an alkyl azulene. H. Pommer (Liebigs Annalen der Chemie, volume 579, 47 et seq., 1953) describes a multi-stage synthesis of alkylated azulenes with yields in the dehydrogenation stage of a maximum of 10–15%. Moreover, the six-stage azulene synthesis carried out by Anderson and Nelson (J. Am. Chem. Soc., 73, 232 et seq., 1951) proceeds with a yield of only 5.8%, calculated on the decahydro-2-naphthol used as starting material. See also: H. Pommer, "Ueber den Stand der Forschung auf dem Gebiet der Azulene" (Angew. Chemie, 62, 1950, 281–289) and M. Gordon, "The Azulenes" (Chem. Review, 1951, pages 127–200). German patent specification No. 942,326 has disclosed a process for the production of azulenes in which azulenes are obtained without a final dehydrogenation stage being necessary. In the process disclosed in that specification, a cyclopentadiene, which may or may not be substituted and which has at least two adjacent unsubstituted carbon atoms, or an indene, is condensed with a derivative of glutaconic dialdehyde, which may be alkylated in the α-position and/or in the β-position and in which the enolised aldehyde group may be replaced by an arylamide group, which if desired is substituted by an N-alkylradical, this condensation being carried out in known manner to form the corresponding fulvene, whereafter the fulvene is converted into the corresponding azulene, if desired in the presence of an inert organic solvent. This process gives good yields, but the starting materials are not readily available.

The present invention is based on the discovery that the dihydroazulenes lose hydrogen extraordinarily easily, frequently even spontaneously, and change into azulenes, and that the dihydroazulenes can be dehydrogenated under very gentle condition. Good yields can also be obtained by dehydrogenating substituted dihydroazulenes, it being possible for the substituents to belong to very different classes.

The dehydrogenation can for example be carried out by heating the dihydroazulenes in vacuo. It is preferred to work in the presence of high-boiling solvents such as benzidine. The dehydrogenation can be facilitated in a manner known per se by adding a dehydrogenating agent or a catalyst. An example of a suitable additive is chloranil. The process takes place for example in accordance with the following equation:

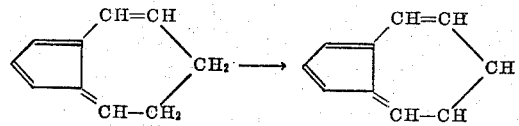

It has now been found that azulenes can be produced by a process which is technically very advantageous if a cyclopentadiene, which may be substituted or unsubstituted and which has at least two adjacent unsubstituted carbon atoms, or an indene, is condensed with a compound of the aliphatic series which contains two carbonyl groups in the 1- and 5-positions to form the corresponding dihydroazulene, and the latter is then dehydrogenated. Particularly suitable compounds of the aliphatic series which contain two carbonyl groups in the 1- and 5-positions are 1,5-ketoaldehydes, 1,5-diketones and 1,5-dialdehydes, and also their cyclic or open-chain derivatives. Examples of suitable compounds are glutaric acid dialdehyde and its open-chain or cyclic derivatives such as the acetals. The cyclic acetals of glutaric acid dialdehyde can be synthesised from inexpensive products of technical large-scale production, for example acrolein and vinyl ether. This process is illustrated by the following formula diagram:

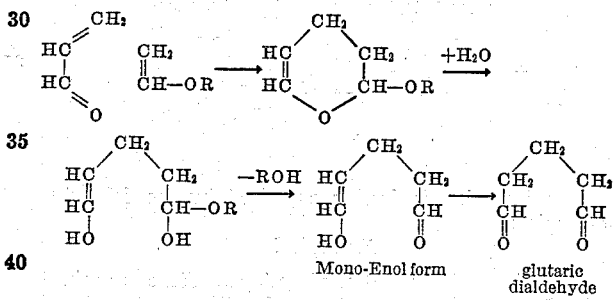

By treating the cyclic acetals with acids, the glutaric acid dialdehyde is liberated and this can then be condensed with cyclopentadiene in the manner indicated above.

Instead of using glutaric acid dialdehyde itself, it is also possible to use other substances closely related to glutaric acid dialdehyde, for example 1,4-dihydropyridine of the following formula

1,4-dihydropyridine is a cyclic imide of the dienol form of glutaric acid dialdehyde, and it behaves as such with respect to cyclopentadiene. This consequently makes possible a particularly simple embodiment of the process of the invention: cyclopentadiene and pyridine are mixed in alcohol and treated with metallic sodium, the pyridine changing into 1,4-dihydropyridine, which then condenses directly with the cyclopentadiene to form a brown intermediate product which has still not been explained in detail. If the alcohol is removed from such reaction mixture and if the residue is heated in vacuo, preferably in the presence of benzidine, azulene is obtained in the comparatively very good yield of 25–30%. The yield is improved (to 30–40%) if some chloranil is additionally added for dehydrogenation purposes. In accordance with the observation made by Shaw, Journal Chem. Soc. London, 127, page 215, pyridine itself can be reduced with sodium and alcohol and then the dihydropyridine can be split up with hydroxylamine to form the dioxime of glutaric acid dialdehyde; this compound also yields azulene according to the invention on being condensed with cyclopentadiene. In general, however, the aforementioned process in which pyridine is treated in the presence of the cyclopentadiene with metallic sodium is simpler and more suitable for large scale use.

Instead of using pyridine, it is also possible to use substituted pyridines, such as α-picoline and 2,6-dimethyl pyridine. In this case, the inner cyclic imides of 5-keto-hexyl aldehyde and of 2,6-diketoheptane are formed as intermediate products.

It is also possible in accordance with the following formula diagrams, by the addition of for example acrolein to isopropenyl methyl ether or methyl vinyl ketone to vinyl ethyl ether or methyl isopropenyl ether, to obtain intermediates which can readily be condensed in the aforementioned manner with cyclopentadienes to form azulenes.

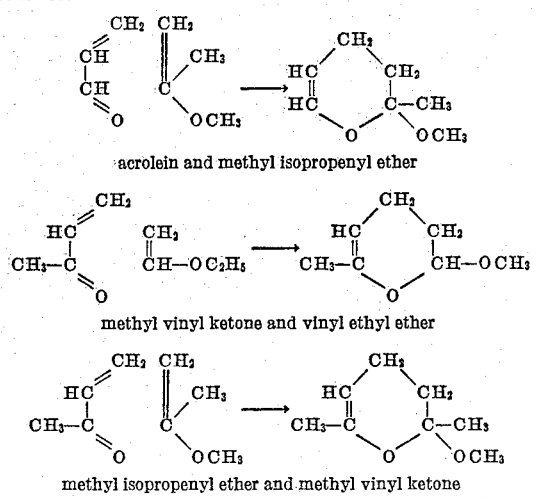

acrolein and methyl isopropenyl ether methyl vinyl ketone and vinyl ethyl ether methyl isopropenyl ether and methyl vinyl ketone The invention is further explained by the following examples:

*Example 1*

1 g. of pyridine and 4 g. of cyclopentadiene are mixed with 50 ccm. of ethanol. 2.3 g. of sodium are introduced in small portions into this mixture at room temperature. The mixture then becomes reddish brown in colour with heating. When all the sodium has dissolved, the ethanol is extracted in vacuo. A deep reddish brown viscous residue is left. This is mixed with 50 g. of benzidine and 12 g. of chloranil. If this mixture is now introduced in relatively small portions (about 5 g. in each case) into a continuous distillation apparatus with steam superheated to 250–300° C., a bluish coloured distillate distills over. On completion of the distillation, the distillate is taken up in acetone and about 50 ccm. of petroleum ether are added to this solution. The benzidine which has also distilled over during the distillation precipitates in the acetone phase and the azulene enters the petroleum ether. After the aqueous acetone phase has been submitted to extraction by shaking several times with petroleum ether, and after subsequent removal of the basic constituents in the combined petroleum ether extracts with dilute hydrochloric acid, the latter extracts are dried over calcium chloride. The petroleum ether is then distilled off through a small column and 2.2 g. of crystallised azulene are obtained as a residue, this quantity being 35% of the theoretical. Melting point of the trinitrobenzolate: 166–167° C.

*Example 2*

2.3 g. of sodium are added in relatively small portions to a mixture of 4.6 g. of α-picoline and 4 g. of cyclopentadiene in 50 ccm. of ethanol. The reaction mixture becomes reddish brown in colour during the violent exothermic reaction which occurs. On completion of the reaction, the ethanol is extracted in vacuo, and 50 g. of benzidine and 12 g. of chloranil are added to the residue. This mixture is then subjected to distillation, as described in Example 1, with steam superheated to 150–300° C. The distillate is taken up in acetone, and, as described in Example 1, the 4-methyl azulene which is formed is extracted by shaking this solution with petroleum ether. After the petroleum ether phase has been dried over calcium chloride, the petroleum ether is distilled off through a small column. A blue oil is left, this being 4-methyl azulene. Yield: 2 g. of 4-methyl azulene, which represents 28% of the theoretical. Melting point of the trinitrobenzolate: 177–178° C.

*Example 3*

4.6 g. of β-picoline and 4 g. of cyclopentadiene are dissolved in 50 ccm. of ethanol. 2.3 g. of sodium are slowly introduced into this mixture. During the reaction the mixture becomes reddish brown in colour; when the reaction is complete the ethanol is extracted in vacuo and then 50 g. of benzidine and 12 g. of chloranil are added to the residue. This mixture is then subjected to distillation with steam superheated to 250–300° C., as described in Example 1, and the distillate is taken up in acetone. The 5-methyl azulene which is formed is extracted by shaking with petroleum ether and subsequently the benzidine is removed by washing with dilute hydrochloric acid. After the petroleum ether phase has been dried over calcium chloride, the organic solvent is distilled off through a small column. As residue, there are obtained 2.3 g. of a blue oil, which is 5-methyl azulene, this quantity being 33% of the theoretical. The trinitrobenzolate melts at 146–147° C.

*Example 4*

5.4 g. of 2,6-lutidine and 4 g. of cyclopentadiene are dissolved in 50 ccm. of ethanol and 2.3 g. of sodium are added thereto. The reaction mixture becomes reddish brown in colour during the violent reaction. When the reaction has ended, the ethanol is extracted in vacuo and 50 g. of benzidine and 12 g. of chloranil are added to the residue. This mixture is subjected to distillation with steam superheated to 25–300° C., as described in Example 1, and the distillate is worked up in the manner described in Examples 1 to 3. In this way, there are obtained 2.4 g. of 4,8-dimethyl azulene in the form of violet needles with a melting point of 69° C. The melting point of the trinitrobenzolate is 179° C. The yield in this case is 31% of the theoretical.

*Example 5*

15.6 g. of 2-n-butoxy-3,4-dihydro-1,2-pyrane of the following formula

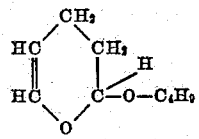

(produced according to R. I. Longley, Jr. and W. S. Emerson, Journal of the American Chemical Society, vol. 72, 3079 (1950); C. W. Smith, D. G. Norton and S. A. Ballard, Journal of the American Chemical Society, vol. 73 (1951)) are heated with 50 ccm. of N hydrochloric acid to about 60–70° C. until completely dissolved. The solution is then neutralised with sodium bicarbonate, saturated with sodium chloride and the glutaric acid dialdehyde which is formed is extracted by shaking several times with ether. After the combined ether extracts have been dried over anhydrous sodium sulphate, the major part of the ether is extracted in vacuo. The residue is taken up in 100 ccm. of absolute ethanol and 10 g. of freshly distilled cyclopentadiene are added to this solution. This mixture is then run into a solution of 2.3 g. of sodium in 50 ccm. of absolute ethanol while cooling with ice. After standing for 1 hour, very dilute acetic acid is added to the reaction mixture, the oil which separates out is taken up in ether, and then the ethereal phase is washed until neutral and dried over anhydrous sodium sulphate. After the ether has been distilled off, 100 g. of benzidine and 15 g. of chloranil are added to the residue and this mixture is subjected to distillation with steam superheated to 250–300° C., as described in Example 1. The distillate is worked up in the manner described in Examples 1 to 3 and finally crystalline azulene is obtained with a melting point of 98–99° C. The trinitrobenzolate thereof melts at 166° C.

*Example 6*

8.5 g. of 2-ethoxy-6-methyl-3,4-dihydro-1,2-pyrane of the following formula

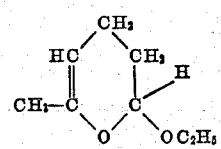

(produced according to R. I. Longley, Jr. and W. S. Emerson, Journal of the American Chemical Society, vol. 72, 3079 (1950); C. W. Smith, D. G. Norton and S. A. Ballard, Journal of the American Chemical Society, vol. 73, 5267 (1951)) are heated with 30 ccm. of N hydrochloric acid and while stirring to about 50° C. until the pyrane has completely dissolved. The solution is then neutralised with sodium bicarbonate, saturated with sodium chloride, and the aldehyde, which is 5-oxo-n-hexanal, is extracted with ether. The ethereal phase is dried over anhydrous sodium sulphate and pentadiene and 50 ccm. of absolute ethanol are added to the residue. A solution of 1.2 g. of sodium in 30 ccm. of absolute ethanol is added to the resulting solution. After the mixed solutions have stood for a short time at room temperature, dilute acetic acid is added to the reaction mixture and the oil which separates out is taken up in ether. The ethereal phase is dried over anhydrous sodium sulphate. After the ether has been removed, 50 g. of benzidine and 7 g. of chloranil are added to the residue and this mixture is subjected to distillation with steam superheated to 250–300° C., as described in Example 1. The distillate is worked up in the manner described in Examples 1 to 3. In this way a blue oil, which is 4-methyl azulene, is obtained; the trinitrobenzolate thereof has a melting point of 177–178° C.

*Example 7*

2.3 g. of sodium are slowly introduced into a mixture of 4 g. of pyridine, 5 g. of methyl cyclopentadiene and 50 ccm. of ethanol. A violent reaction takes place and the reaction mixture becomes reddish brown in colour. When all the sodium has dissolved, the solution is cooled to room temperature and very dilute acetic acid is added. The organic phase is taken up in ether and then the ethereal solution is washed until neutral and dried over anhydrous sodium sulphate. The residue obtained after removing the ether in vacuo is thoroughly triturated with 50 g. of benzidine and 12 g. of chloranil. This mixture is subjected to distillation with steam superheated to 250–300° C., as described in Example 1. The distillate obtained is worked up as more fully described in Examples 1 to 3 and a blue oil is obtained, which is 1-methyl-azulene. This compound forms a trinitrobenzolate with a melting point of 159–160° C.

*Example 8*

2.3 g. of sodium are slowly added to a mixture of 4 g. of pyridine, 11 g. of benzhydryl cyclopentadiene and 100 ccm. of ethanol. During the violent reaction, the reaction mixture becomes brownish red in colour. After the reaction has ended, the solution is run into very dilute acetic acid, the organic phase is taken up in ether, and the ethereal solution is washed neutral with aqueous sodium carbonate solution and dried over sodium sulphate. After the ether has been distilled off in vacuo, 50 g. of benzidine and 12 g. of chloranil are added to the residue and this mixture is subjected to distillation with steam superheated to 250–300° C., as described in Example 1. The distillate is worked up in the manner described in Examples 1 to 3. 1-benzhydryl azulene is thus obtained in the form of blue crystals with a melting point of 87–88° C. Trinitrobenzolate: M.P. 141 to 142° C. (from ethanol).

*Example 9*

2.3 g. of sodium are slowly introduced into a mixture of 4 g. of pyridine, 7 g. of 2-isopropyl-3-methyl-cyclopentadiene and 50 ccm. of ethanol. When the violent reaction has ended, very dilute acetic acid is added to the reddish brown reaction mixture obtained and this mixture is submitted to extraction by shaking several times with ether. The ethereal phase is then washed until neutral with dilute sodium solution and dried over sodium sulphate. After the ether has been removed in vacuo, an oily residue is left which is mixed with 50 g. of benzidine and 12 g. of chloranil and then distilled with steam superheated to 250–300° C., as described in Example 1. After working up the distillate in the manner described in Examples 1 to 3, 1-isopropyl-2-methyl azulene is obtained in the form of a blue oil.

*Example 10*

2.3 g. of sodium are slowly introduced into a mixture of 1 g. of pyridine, 6 g. of freshly distilled indene and 50 ccm. of ethanol. The reaction mixture becomes brownish red in colour in a violent reaction. When the reaction has ended, very dilute acetic acid is added to the solution and the resulting mixture is submitted to extraction by shaking it several times with ether. The combined ether extracts are then washed until neutral with dilute sodium carbonate solution and dried over sodium sulphate. After the ether has been removed in vacuo, the residue is thoroughly triturated with 50 g. of benzidine and 12 g. of chloranil and this mixture is subjected to distillation with steam superheated to 250–300° C., as described in Example 1. After the distillate has been worked up as described in Examples 1 to 3, 1,2-benzazulene is obtained in the form of dark green crystals, which dissolve in organic solvents to give a blue colour. Melting point of 1,2-benzazulene; 176° C. Its trinitrobenzolate melts at 153° C.

What I claim is:

1. In a process of producing azulenes, the steps which comprise condensing an aliphatic dicarbonyl compound of the general formula $C_nH_{2n-2}O_2$, wherein $n$ is an integer, said compound having a straight carbon chain of at least five carbon atoms and having two carbonyl groups in 1- and 5-position on said chain with a cyclopentadiene having at least two adjacent unsubstituted carbon atoms, and dehydrogenating the resulting dihydroazulene.

2. In a process of producing azulenes, the steps which comprise condensing a compound selected from the group consisting of dicarbonyl compounds of the general formula $C_nH_{2n-2}O_2$, wherein $n$ is an integer, said dicarbonyl compounds having a straight carbon chain of at least five carbon atoms and two carbonyl groups in 1- and 5-position on said chain, cyclic acetals and imides of said dicarbonyl compounds, and dioximes thereof their cyclic and open-chain acetals and imides, and their open-chain dioximes, with a cyclopentadiene having at least two adjacent unsubstituted carbon atoms, and dehydrogenating the resulting dihydroazulene.

3. In a process of producing azulenes, the steps which comprise condensing a 1,4-dihydropyridine with a cyclopentadiene having at least two adjacent unsubstituted carbon atoms, and dehydrogenating the resulting dihydroazulene.

4. In a process of producing dihydro azulenes, the step which comprises condensing a 1,4-dihydropyridine with a cyclopentadiene having at least two adjacent unsubstituted carbon atoms.

5. In a process of producing azulenes, the steps which comprise condensing glutaric dialdehyde with a cyclopentadiene having at least two adjacent unsubstituted carbon atoms, and heating the resulting dihydroazulene in a high-boiling solvent to a temperature between about 250° C. and 300° C. to form the corresponding azulene.

6. In a process of producing azulenes, the steps which comprise condensing 5-oxo-n-hexanol with a cyclopentadiene having at least two adjacent unsubstituted carbon atoms with the addition of an alkali metal and an inert organic solvent, and heating the resulting dihydroazulene in a high-boiling solvent to a temperature between about 250° C. and 300° C. to form the corresponding azulene.

7. In a process of producing azulenes, the steps which comprise slowly and gradually adding an alkali metal to a mixture of a pyridine compound of the general formula

wherein $R_1$ and $R_2$ are radicals bound to a carbon atom of the pyridine ring and selected from the group consisting of hydrogen and lower alkyl radicals, and a cyclopentadiene having at least two adjacent unsubstituted carbon atoms, in alcohol, completing condensation by heating until the reaction mixture has become reddish brown in color, evaporating the alcohol from the resulting reddish brown reaction mixture, and dehydrogenating the resulting dihydroazulene to form the corresponding azulene.

8. In a process of producing azulene, the steps which comprise slowly and gradually adding metallic sodium to a mixture of pyridine and cyclopentadiene in ethanol, completing condensation by heating until the reaction mixture has become reddish brown in color, evaporating the alcohol from the resulting reddish brown reaction mixture, and dehydrogenating the resulting dihydroazulene to form the corresponding azulene.

9. In a process of producing 4-methyl azulene, the steps which comprise slowly and gradually adding metallic sodium to a mixture of α-picoline and cyclopentadiene in ethanol, completing condensation by heating until the reaction mixture has become reddish brown in color, evaporating the alcohol from the resulting reddish brown reaction mixture, and dehydrogenating the resulting 4-methyl dihydroazulene to form 4-methyl azulene.

10. In a process of producing 5-methyl azulene, the steps which comprise slowly and gradually adding metallic sodium to a mixture of β-picoline and cyclopentadiene in ethanol, completing condensation by heating until the reaction mixture has become reddish brown in color, evaporating the alcohol from the resulting reddish brown reaction mixture, and dehydrogenating the resulting 5-methyl dihydroazulene to form 5-methyl azulene.

11. In a process of producing 4,8-dimethyl azulene, the steps which comprise slowly and gradually adding metallic sodium to a mixture of 2,6-lutidine and cyclopentadiene in ethanol, completing condensation by heating until the reaction mixture has become reddish brown in color, evaporating the alcohol from the resulting reddish brown reaction mixture, and dehydrogenating the resulting 4,8-dimethyl dihydroazulene to form 4,8-dimethyl azulene.

12. In a process of producing 1-methyl azulene, the steps which comprise slowly and gradually adding metallic sodium to a mixture of pyridine and methyl cyclopentadiene in ethanol, cooling the resulting reddish brown reaction mixture to room temperature, adding dilute acetic acid thereto, extracting the mixture with ether, evaporating the ether from the resulting ethereal solution, and dehydrogenating the resulting 1-methyl dihydroazulene to form 1-methyl azulene.

13. In a process of producing 1-isopropyl-2-methyl azulene, the steps which comprise slowly and gradually adding metallic sodium to a mixture of pyridine and 2-isopropyl-3-methyl cyclopentadiene in ethanol, cooling the resulting reddish brown reaction mixture to room temperature, adding dilute acetic acid thereto, extracting the mixture with ether, evaporating the ether from the resulting ethereal solution, and dehydrogenating the resulting 1-isopropyl-2-methyl dihydroazulene to form 1-isopropyl-2-methyl azulene.

References Cited in the file of this patent

UNITED STATES PATENTS

| | | |
|---|---|---|
| 2,804,485 | Ziegler et al. | Aug. 27, 1957 |
| 2,805,266 | Ziegler et al. | Sept. 3, 1957 |

OTHER REFERENCES

"Two Step Synthesis of Azulene," by W. von E. Doering et al., 75, J.A.C.S., page 2386 (1953).